March 7, 1961 F. THOMA 2,974,265
ELECTRIC CLOCK
Filed Dec. 24, 1956 2 Sheets-Sheet 1
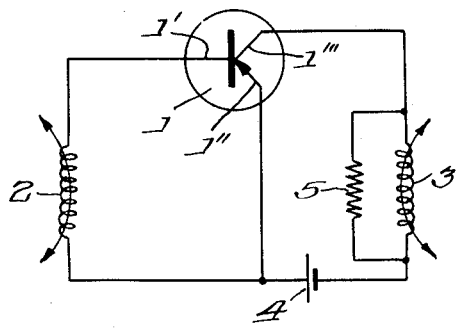
Fig. 1.
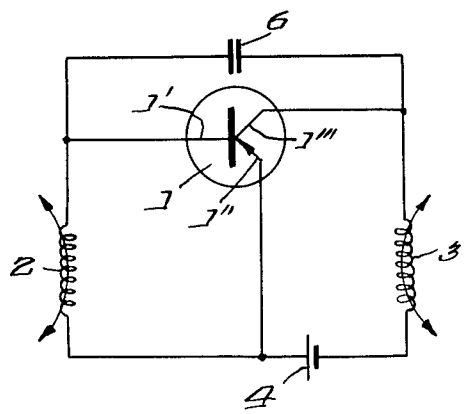
Fig. 1A.
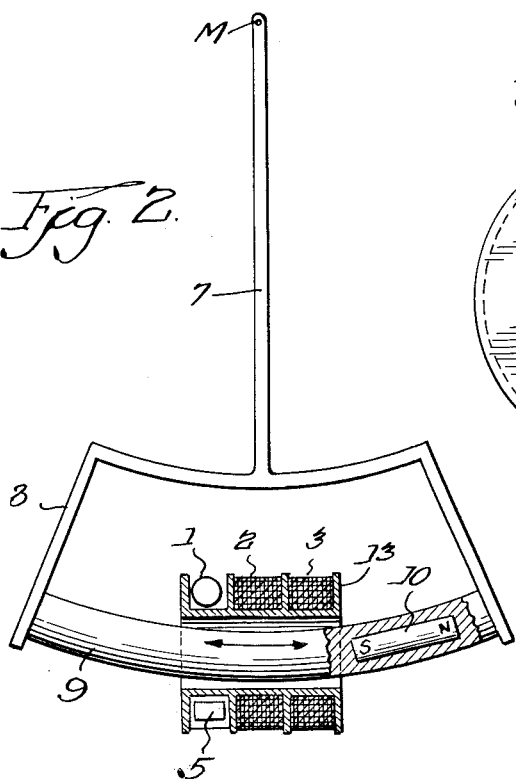
Fig. 2.
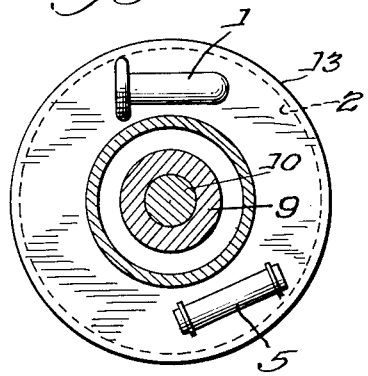
Fig. 3.
Inventor.
Fritz Thoma.
By  Atty.

March 7, 1961     F. THOMA     2,974,265
ELECTRIC CLOCK
Filed Dec. 24, 1956     2 Sheets-Sheet 2
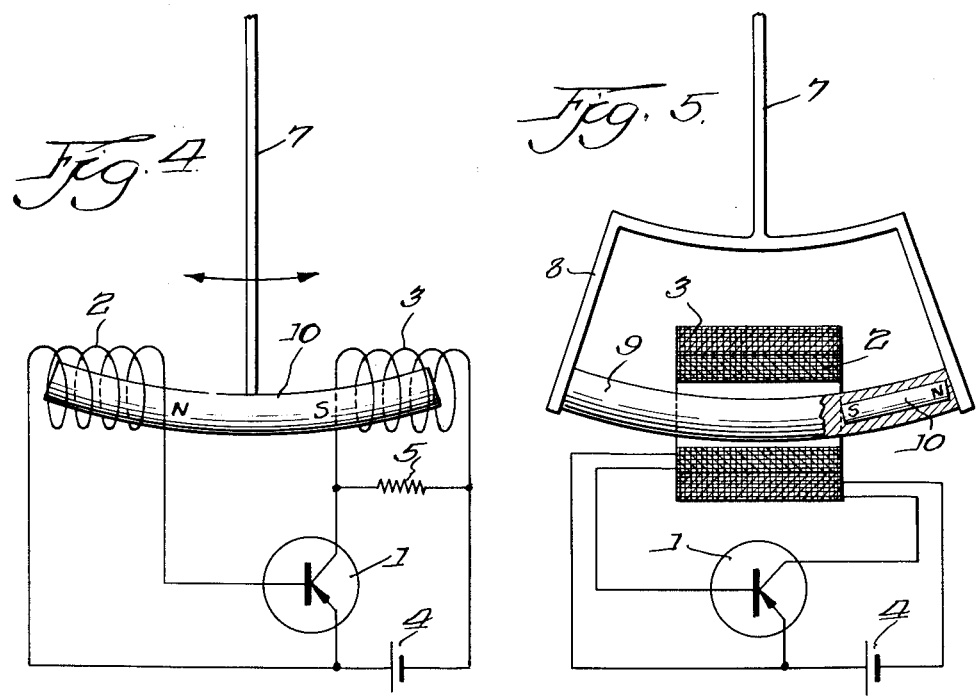
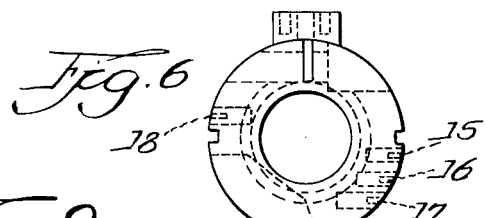
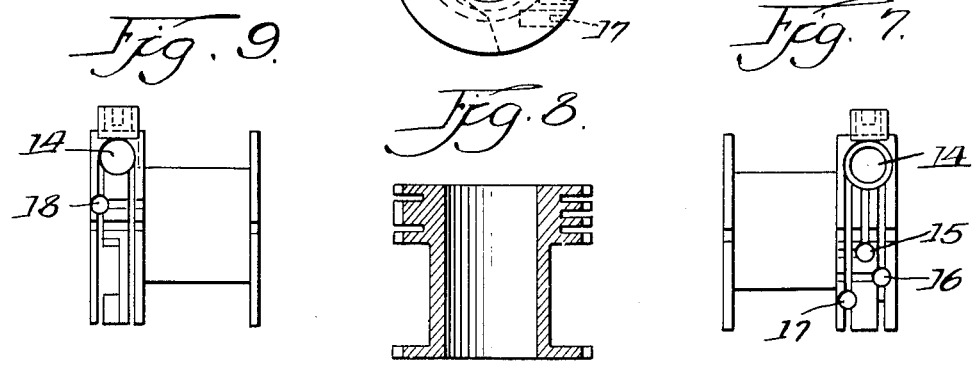
Inventor.
Fritz Thoma.

United States Patent Office 2,974,265
Patented Mar. 7, 1961

2,974,265
ELECTRIC CLOCK

Fritz Thoma, St. Georgen, Black Forest, Germany, assignor to Kieninger & Obergfell, St. Georgen, Black Forest, Germany, a German company Filed Dec. 24, 1956, Ser. No. 630,421

Claims priority, application Germany Dec. 24, 1955

12 Claims. (Cl. 318—132)

This invention relates to an electric clock and is particularly concerned with an electronically controlled clock comprising transistor or other semiconductor means for stabilizing the drive thereof.

There are mechanical oscillating structures known, especially pendulum drives and balances for clocks, wherein the oscillating element is a magnet, for example, a permanent magnet. Such magnet is affected by an electric circuit operating without the aid of contacts, for example, a coil, for the purpose of generating electrical impulses which in turn generate by means of a tube or a semiconductor device, especially transistor device, feedback impulses in a corresponding electric circuit, for imparting to the oscillating element a periodically effective driving force. The control is usually effected, without the aid of contacts, by means of two induction coils, namely, a generator coil in which electrical impulses are generated by the oscillating magnet, and a motor coil, which affects the oscillating magnet by driving impulses. In the case of a transistor feedback arrangement, the generator coil is usually connected in the emitter circuit, while the motor coil is connected in the collector circuit. There is in addition in the emitter-collector circuit an electric voltage source, for example, a battery, which supplies the energy for maintaining the mechanical oscillations.

The object of the invention is to provide an arrangement for stabilizing the known pendulum drive by means of transistors or other semiconductor elements. It depends in this connection essentially upon arranging the induction coil device in such a manner that the electronic control operates as efficiently as possible so as to save the battery.

This object is according to the invention realized by providing by means of a bracket a permanent magnet at an end of the pendulum, outside of the center and on the side thereof at which is disposed the impulse coil which is connected in the output circuit of the transistor and surrounds such magnet.

The surprising effect of this arrangement resides particularly therein that the magnet induces in the control coil at the moment of maximal velocity of the pendulum a current impulse which is amplified in the transistor and transmitted to the impulse coil, the magnetic field of the latter attracting the magnet and thereby driving the pendulum.

The great advantage of the above indicated amplification is that the battery is used as sparingly as imaginable, resulting in minimal discharge thereof.

The corresponding galvanically completely closed circuit in which the normal current flow amounts only to a few micro-amperes, is furthermore of advantage in that interruption thereof is unnecessary during transport and prolonged storage. The normally flowing current maintains the transistor and the battery always in readiness for operation.

In accordance with another object and feature of the invention, there may be provided parallel to the impulse coil a resistor with a resistance on the order of magnitude of about 5 to 10 K-ohm. This parallel resistor acts in stabilizing manner on the operation of the transistor because it effects the required uncoupling between the control and the impulse coil and suppresses oscillation of the transistor.

Other objects of the invention have to do with the most favorable spatial disposition of the individual parts of the arrangement, one with respect to the other.

The foregoing and further objects and features of the invention will be brought out in the course of the description which will be rendered below with reference to the accompanying drawings. In these drawings, Fig. 1 is a circuit diagram showing an electronic drive for pendulum clocks according to the invention;

Fig. 1A is a circuit diagram showing a modification of the electric drive circuit illustrated in Fig. 1;

Fig. 2 shows in schematic front view the pendulum with the electronic drive means therefor;

Fig. 3 is a side view of the arrangement of Fig. 2;

Figs. 4 and 5 indicate two further embodiments according to the invention; and

Figs. 6 to 9 show as examples particularly suitable forms of a spool for coils and other parts used in the arrangement according to Figs. 2 and 3; Fig. 6 showing the spool in a view as in Fig. 3; Fig. 8 showing the spool in longitudinal section; and Figs. 7 and 9 respectively show the spool as seen from the left and right thereof as shown in Fig. 6.

Referring now to Fig. 1, numeral 1 indicates the transistor comprising in usual manner a base 1', an emitter 1'', and a collector 1'''. As will be seen, there is a control coil 2 in the input circuit, being connected between the base 1' and the emitter 1''. An impulse or motor coil 3 is connected in the output circuit that is between the emitter 1'' and the collector 1'''.

The transistor operates in the arrangement according to the invention as an amplifier and there is for this reason a battery 4 in the output circuit. For this battery which has to deliver a steady voltage on the order of 1.5 volts, there may primarily be used air-oxygen elements which are, as has been shown, adapted to keep clocks in operation for years.

There is further provided a resistor 5 for the required uncoupling and at the same time suppressing oscillation or hunting of the transistor. The resistor has for this purpose a resistance on the order of about 5 to 10 K-ohm.

As shown in Fig. 1 in dotted lines, instead of using the resistor 5, there may be provided a capacitor 6 between the input and output circuit of the transistor to effect a feedback. This capacitor may be of a magnitude of about 2000 to 10,000 micromicrofarad.

The structurally favorable arrangement of the parts is apparent from Fig. 2. The pendulum is suspended at point M, comprising, as schematically shown, a rod 7 and a bracket 8. The bracket 8 carries a cross bar 9 in which is formed a bore for receiving a rod-like magnet 10.

It is essential for the arrangement according to Fig. 2 that the impulse coil 3 is disposed on the side where the magnet 10 is located, the coil surrounding the magnet. At the left of the coil 3 and closely adjacent thereto is disposed the control coil 2. The coils are, accordingly, disposed coaxially side-by-side.

As contemplated by the invention, the transistor 1 and the resistor 5 may be disposed upon the coil body 13 which also carries the impulse coil 3 and the control coil 2.

The invention is not limited to the explained embodiment. It has been found that the manner of winding the coils as well as the mutual coupling can favorably effect not only the energy output of the arrangement but also the dependance of the oscillating element on irregularities of the structural disposition of the electrical parts, for example, voltage fluctuation or the temperature coefficient of the transmission element, especially of transistors.

In accordance with a particular feature of the invention, this recognition may be usefully realized in the construction of the coils by mutually matching the coils as to the exciting phases thereof, by a manner of winding deviating from the coil layers or by mutual coupling or by the application of both features, so as to produce in the transistor input and output a phase difference as small as possible.

This may be achieved by disposing at least one of the coils and/or the magnet movable and adjustable so that the instants of impulse rises may be set at an optimum. It is in this manner possible to set the arrangement so as to provide an efficiency of the electrical feedback as high as possible with least drain on the voltage source and especially the battery.

It is in accordance with another feature of the invention suitable to provide at least one of the coils with crossing or lattice wound windings for the purpose of reducing the capacitance thereof and also the oscillation-tendency or hunting of the electrical circuit.

In accordance with still another feature of the invention, a relatively close coupling, if desired, a coupling of the generator-motor coil arrangement as close as possible should be aimed at, especially in case the tendency to oscillate or hunt should not be sufficiently suppressed by one or more of the mentioned means. The close coupling affords the advantage of producing well and sharply defined rectangular impulses.

In accordance with a particular embodiment of the invention one of the coils is for this purpose disposed upon the other coil coaxial therewith and extending partially or wholly over the length thereof. In such close coupling, it was surprisingly found that temperature and voltage fluctuations of the circuit are equalized to such far-reaching extent as to result in a considerably greater operating accuracy of the oscillating system.

This is particularly the case when the impulse or motor coil is disposed outside of the control coil. If the control coil should conversally be positioned outside, there will be obtained a particular efficiency so far as the energy is concerned, but the independance on the temperature will not be as far-reaching as in the first case. Accordingly, the provision of a compensating thermistor or other temperature correcting device would be desirable in the latter case.

A compromise between the two above mentioned coaxial arrangements of the coils resides in accordance with the invention in winding the layers of the coils alternately one between the other. In case of the coaxial arrangement or the alternate telescoping disposition of the coil layers, other types of winding may be applied if desired, especially winding of the crossing type.

Referring now to Figs. 4 and 5, there are shown two further embodiments of the invention, illustrating two particular possibilities of the formation of the coils in structures such as pendulum clocks. It may be mentioned, however, that corresponding features may be advantageously applied in connection with other automatically controlled mechanically oscillating devices operating without contacts, for example, in clocks and in master standard timing devices.

In Fig. 4, numeral 2 again indicates the control coil and 3 the motor coil. The remaining reference numerals indicate similarly referenced parts as in Figs. 1 and 2. The windings of the coils 2 and 3 in Fig. 4 are, however, in the manner of crossing windings, resulting in a considerable increase in the electrical efficiency and at the same time a very considerable increase in the operating accuracy of the pendulum.

The arrangement according to Fig. 5 differs from that shown in Fig. 4 by disposing the two coils 3 and 2 coaxially one upon the other instead of side-by-side, somewhat non-symmetrical with respect to the approximate normal position of the pendulum. Both coils have the same length, being spatially dimensioned so that the ratio of length to diameter amounts approximately to 5. In view of the fact that the isochronism of the coils which is as a result of the impulse sharpness greatest when the coils are as short as possible, and in view of the fact that efficiency is on the other hand the better the longer the coils are, there must be an optimal compromise between the two requirements. The ratio of length to diameter of the coils should for this purpose be approximately on the order of 1.5 to 1 and 10 to 1.

The embodiments of the invention may be modified in numerous ways. For example, other switching elements and/or controllable amplifying semiconductor devices may be used in place of transistors. A balance or the like may take the place of the pendulum. A plurality of coils may be provided; for example, in Fig. 4, there may be provided at each end of the magnet a double coil of the coaxial type according to Fig. 5 and such coils may be connected to two separate transistor devices or else to one transistor arrangement.

As mentioned before, Figs. 6 to 9 show by way of example a particularly suitable embodiment of a spool such as already indicated at 13 in Figs. 2 and 3. The corresponding spool also serves as carrier for the transistor and for the resistor, the mounting being effected without requiring any particular fastening means, merely by suitable structural form of the parts. The spool body is for this purpose provided with suitable grooves, bores or other recesses formed therein for receiving the corresponding elements, which may be directly inserted therein by suitably bending the terminal conductors thereof and, at the most, by the use of a varnish to secure them in place. Numeral 14 indicates the recess for the transistors; numerals 15 to 18 indicate the openings for the terminal conductors. Further switching elements may be inserted within milled recesses. The portions respectively remaining along the recesses for the transistor and the other elements may be provided with further grooves or the like formed therein, extending radially as well as axially, and serving as outwardly protected guides for connecting wires for the individual portions of the circuit.

Changes may be made within the scope and spirit of the appended claims.

I claim:

1. In an electronically controlled clock having a transistor control circuit and an oscillating member including a magnetic portion operative with respect to two coils arranged coaxially with respect to the path of oscillation of said oscillating member, said coils being included in said transistor control circuit and being respectively operative as a generator coil and as a motor coil, said magnetic portion being in the form of a rod-like magnet carried by said oscillating member near one end thereof, said coils being disposed closely adjacent one with respect to the other and acting in said transistor control circuit respectively as input and output impedances, thereby providing an oscillating circuit, electrical compensation means cooperatively disposed with respect to at least one of said coils for damping said oscillating circuit to such extent that the circuit is caused to oscillate only in predetermined positions of the oscillating member, by the inductive effect imparted to said coils by the oscillating member, thereby delivering sharply defined impulses for driving said oscillating member, while inhibiting oscillation of said circuit at instances outside of the impulses produced.

2. A structure and cooperation of parts according to claim 1, wherein said coils are disposed offset from the center line of said oscillating member in the direction of said permanent magnet.

3. A structure and cooperation of parts according to claim 1, wherein said coils are disposed so that said permanent magnet enters during oscillation first into said motor coil and thereupon into said generator coil.

4. A structure and cooperation of parts according to claim 3, wherein said permanent magnet is positioned in one direction of oscillation at least in part within said motor coil while being during oscillation in the other direction entirely outside of said motor coil.

5. A structure and cooperation of parts according to claim 1, wherein said oscillating member is a crossbar carried by a pendulum rod at the free end thereof, said permanent magnet being carried by said crossbar at one end thereof, said coils surrounding said crossbar.

6. A structure and cooperation of parts according to claim 5, comprising a spool for said coils which is common thereto, said coils being disposed on said spool in coaxial relationship one adjacent the other.

7. A structure and cooperation of parts according to claim 5, comprising a spool for said coils which is common thereto, said coils being disposed on said spool side-by-side in coaxial relationship.

8. A structure and cooperation of parts according to claim 5, comprising a spool for said coils which is common thereto, said coils being disposed on said spool one wound upon the other in coaxial relationship.

9. A structure and cooperation of parts according to claim 5, comprising a spool for said coils which is common thereto, said coils being disposed on said spool in coaxial relationship one adjacent the other, recesses being formed in said spool for receiving said transistor and terminal means therefor.

10. A structure and cooperation of parts according to claim 5, comprising a capacitor connected between the base and the collector of said transistor and constituting said compensation means.

11. A structure and cooperation of parts according to claim 5, comprising means for adjustably disposing at least one of the parts including said coils and said permanent magnet for the purpose of adjusting the instants of operative actuation of said coils.

12. A structure and cooperation of parts according to claim 5, wherein the winding of at least one of said coils is a lattice type winding.

References Cited in the file of this patent

UNITED STATES PATENTS

| | | |
|---|---|---|
| 537,769 | Harrison | Apr. 16, 1895 |
| 2,644,893 | Gehman | July 7, 1953 |
| 2,695,381 | Darling | Nov. 23, 1954 |

FOREIGN PATENTS

| | | |
|---|---|---|
| 986,536 | France | Feb. 24, 1954 |
| 1,090,564 | France | Oct. 20, 1954 |